Patented Aug. 15, 1950

2,518,731

UNITED STATES PATENT OFFICE 2,518,731

SYMMETRICAL AND UNSYMMETRICAL TETRANUCLEAR CYANINE DYES AND PROCESS OF PREPARING THE SAME

Thomas R. Thompson, Binghamton, N. Y., assignor to General Aniline & Film Corporation, New York, N. Y., a corporation of Delaware No Drawing. Application December 21, 1948, Serial No. 66,575

8 Claims. (Cl. 260—240.1)

This invention relates to tetranuclear cyanine dyes and particularly to unsymmetrical tetranuclear cyanine dyes and to a method of preparing both the symmetrical and unsymmetrical tetranuclear cyanine dyes.

Symmetrical tetranuclear dyes have been prepared by the methods described in United States Patents 2,388,963, 2,395,879, and 2,430,295, and in British Patent 487,051.

The method described in United States Patents 2,388,963 and 2,430,295 and in British Patent 487,051 consists of first quaternizing a cyclammonium nitrogenous heterocyclic base, containing a methyl-thio group in the $\alpha$- or $\gamma$-position to the nitrogen atom thereof, and condensing it with a 3-substituted rhodanine to obtain the merocyanine dye intermediate. This procedure involves two steps and requires about 4 hours time. The thioketo group of the merocyanine dye intermediate is then converted into a reactive group, such as, for example, thioalkyl group, by fusing the intermediate with methyl p-toluenesulfonate for 2½ hours at 160° C. Two mols of the resulting compound are heated in the presence of pyridine with 1 mol of malonic acid for about 45 minutes to obtain a symmetrical tetranuclear dye in which the two inner nuclei are bridged by a polymethine chain. The minimum time required to prepare the final dye is approximately 7 hours and 15 minutes, exclusive of the time required to cool the reaction mixture in various stages and purification of the dyestuff.

The method described in United States Patent 2,395,879 consists of first condensing 2 molecules of a heterocyclic ketomethylene compound of the 3-substituted rhodanine type with an anhydride or an orthoester of a monocarboxylic acid in the presence of a strong base such as triethylamine to obtain a symmetrical dye intermediate having two rhodanine nuclei linked to one another by a polymethine bridge. This procedure requires about 1 to 1¼ hours time. This dye intermediate is then fused with a mixture of a cyclammonium dye base and a quaternizing agent, such as ethyl p-toluenesulfonate, for ½ to 2½ hours at 150–160° C. Pyridine is added and the mixture reheated at reflux for 20 to 30 minutes. The reaction mixture is then poured into an aqueous solution of potassium bromide and the final dye, in which the two inner nuclei are linked together by a polymethine bridge, obtained by recrystallization from alcohol. The minimum time required for the latter two steps is approximately from 50 minutes to 3 hours, exclusive of the time required to cool the reaction mixture and to recrystallize the final dye.

Theoretically, the dyes of the United States Patent 2,395,879, which contain two thio groups could be alkylated in such manner that only one alkylthio group would be formed. If this reaction could be accomplished, then, further treatment with a quaternary cyclammonium salt containing a reactive methyl group might lead to a trinuclear dye which could again be alkylated and condensed with a second and different cyclammonium salt to produce an unsymmetrical tetranuclear dye. At the present time, there is no method known nor are the intermediates available by which unsymmetrical tetranuclear cyanine dyes could be prepared. It is an object of the present invention to provide an improved method for the production of symmetrical tetranuclear cyanine dyes containing two rhodanine rings as the inner nuclei bridged by the polymethine chain.

A further object is to provide unsymmetrical tetranuclear cyanine dyes bridged by the foregoing chain and to a method of preparing the same.

Other objects and advantages will become apparent from the following description.

I have found that both symmetrical and unsymmetrical tetranuclear cyanine dyes are readily prepared in excellent yield and in readily purifiable form by heating a thiazolone cyanine salt containing a reactive methylene group adjacent to a keto group with a thiazolone cyanine dye salt intermediate in a suitable solvent, such as an aliphatic alcohol, e. g., methyl ethyl, n-propyl, isopropyl and the like, in the presence of a basic condensing agent such as trimethylamine, triethylamine, pyridine, methyl pyridine, ethyl pyridine, quinoline, potassium carbonate and the like, on a steam bath or by heating the reaction mixture at reflux for a period of 5 to 20 minutes.

The dyes obtained by the foregoing procedure are characterized by the following general formulae:

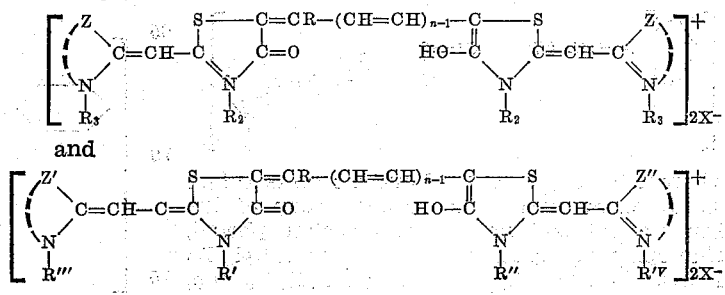

and wherein R represents hydrogen or an alkyl group, e. g., methyl, ethyl, propyl, or butyl, R being only alkyl when $n$ represents 1, both $R_2$'s being the same and representing an alkyl, allyl, aryl, or aralkyl group, e. g., methyl, ethyl, propyl, phenyl, naphthyl, tolyl, benzyl, phenethyl, and the like, $R_3$ represents an aliphatic radical, aryl or aralkyl radical, e. g., methyl, ethyl, propyl, butyl, hydroxyethyl, ethoxyethyl, phenyl, tolyl, naphthyl, benzyl, phenethyl, menaphthyl and the like, R' and R'' which may be alike or different represent an alkyl, allyl, aryl or aralkyl group as given for $R_2$, R''' and R'$v$ which may be alike or different represent an aliphatic, aryl or aralkyl radical as given for $R_3$, $n$ represents a positive integer of from 1 to 3, X represents an acid radical, e. g., chloride, bromide, iodide or alkyl sulfate, alkyl p-toluenesulfonate or perchlorate, Z, Z', and Z'' represent the atoms necessary to complete a heterocyclic nucleus of the type contained in cyanine dyes, e. g., oxazoles, thiazoles, selenazoles, and their polycyclic homologues, such as those of the benzene, naphthalene, i. e., naphthiazole and perinaphthiazole, acenapthene, and anthracene series, pyridine, and its polycyclic homologues, such as quinoline and $\alpha$- and $\beta$-naphthaquinolines, perinaphthiazoles, indolenines, diazines, such as pyrimidines and quinazolines, diazoles (e. g., thio-$\beta$-$\beta$'-diazole), oxazolines, pyrrolines, thiazolones and selenazolines (the polycyclic compounds of these series being substituted if desired in the carbocyclic rings with one or more conventional groups, such as alkyl or aryl as below, amino, hydroxy, alkoxy, i. e., methoxy, ethoxy, etc., and methylenedioxy groups, or by halogen atoms, i. e., chlorine, bromine, etc.), both Z's being the same, Z' and Z'' being the same or different depending upon whether R' and R'' are the same or different. In other words, Z' and Z'' may be the same if R' and R'' are different. However, if R' and R'' are the same then Z' and Z'' must be different.

The thiazolone dye intermediates utilized as the co-reactant with the thiazolone cyanine dye salts are characterized by the following general formulae:

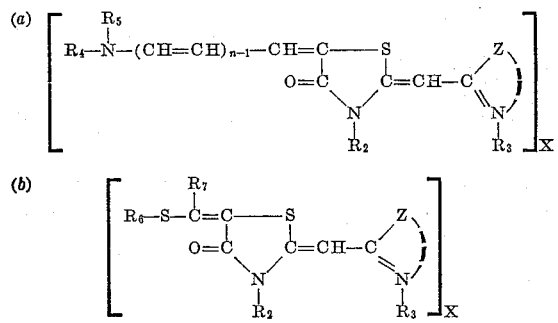

and

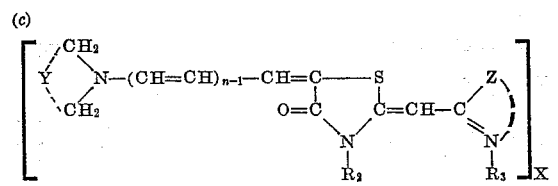

wherein $R_2$, $R_3$, X and Z have the same values as above, $R_4$ represents an aryl group of the benzene and naphthalene series, such as phenyl, chlorophenyl, diphenyl, tolyl, or naphthyl, $R_5$ represents either hydrogen or an acetyl group, $R_6$ represents an alkyl or aralkyl group, e. g., methyl, ethyl, propyl, isopropyl, benzyl, $\beta$-phenethyl, and the like, $R_7$ represents an alkyl group, e. g., methyl, ethyl, propyl, isopropyl, butyl, isobutyl, etc. and $n$ represents a positive integer of from 1 to 3, and Y represents the atoms necessary to complete a saturated heterocyclic nitrogenous nucleus, such as, for example, piperidine, $\beta$- or $\gamma$-pipecoline, pyrrolidine, morpholine, tetrahydroquinoline, and the like.

The dyestuff intermediates illustrated by Formulae $a$ and $c$ are prepared according to the method described in my copending application Serial No. 66,571, filed on December 21, 1948, and the intermediates illustrated by the second formula $b$ are prepared according to the method described in my copending application Serial No. 66,572, filed on December 21, 1948.

The dyestuff intermediates illustrated by Formula $a$ are, in general, obtained by treating a diarylformamidine or its vinylog, such as $\beta$-anilinoacrolein anil hydrochloride or glutaconic aldehyde dianil hydrochloride, in the presence of an acid condensing agent such as acetic anhydride, or in the presence of a basic condensing agent such as triethylamine, or piperidine, with a thiazolone cyanine dye.

The dyestuff intermediates illustrated by Formula $b$ are obtained by treating a thiazolone cyanine dye with an aliphatic acid anhydride in the presence of a mixture of pyridine and triethylamine followed by treatment with phosphorus pentasulfide to yield the thio derivative which is subsequently alkylated with an alkylating agent in the usual way to yield the thioether derivative.

The thiazolone cyanine dyes utilized in preparing the foregoing intermediates and which are condensed with the said intermediates are characterized by the following general formula:

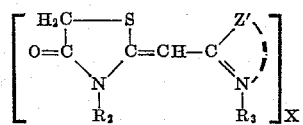

wherein $R_2$, $R_3$, X and Z' have the same values as above, and are prepared according to the method described in my copending application Serial No. 786,814, filed November 18, 1947. In general, the method consists of condensing a substituted thioamide with an $\alpha$-halogen acetic acid. The compounds, in view of their ketomethylene configuration, undergo keto-enol tautomerism, i. e., the keto group enolizes to form a hydroxyl group.

The following examples describe the preparation of some of the thiazolone cyanine dye intermediates illustrated by Formulae $a$ and $b$ which are utilized in the preparation of the tetranuclear cyanine dyes.

*Example I*

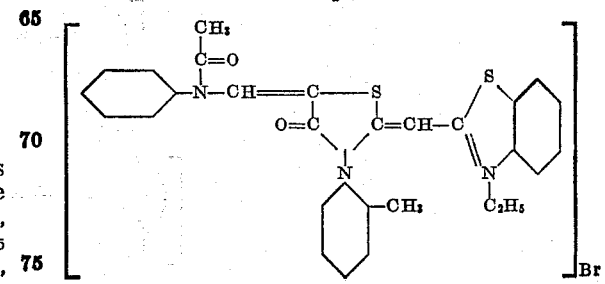

A mixture of 5 grams of diphenylformamidine, 5 grams of the thiazolone cyanine dye of the following structure:

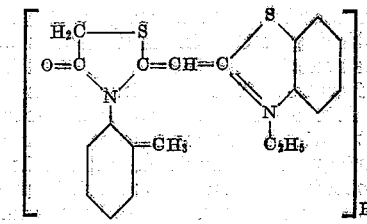

and 15 cc. of acetic anhydride was heated at 140° C. for 30 minutes. After cooling, the product was precipitated with ether and purified by dissolving it in a small amount of methanol followed by precipitation with ether. A yield of 5.9 grams of yellow-green crystals, having a melting point at 213–215° C. was obtained.

*Example II*

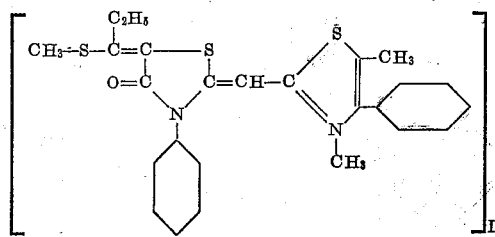

A mixture of 75 cc. of pyridine, 15 cc. of propionic anhydride, 15 cc. of triethylamine, and 15 grams of the thiazolone cyanine dye of the following structure:

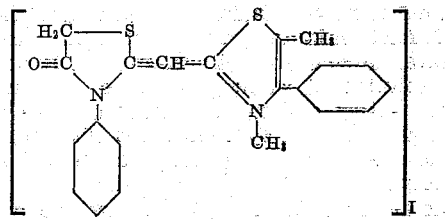

was heated at 120° C. for 30 minutes. Fifteen grams of phosphorus pentasulfide were added in portions and the reaction mixture stirred at 120° C. for 30 minutes. The product was isolated by pouring the reaction mixture into 30 cc. of 5% aqueous solution of potassium iodide. The product was purified by washing with water and subsequently grinding with acetone. A yield of 10.9 grams of yellow glistening crystals melting at 255–260° C. was obtained. The product was fused with 10 cc. of methyl sulfate at 95° C. for 10 minutes to yield a thick solution which upon treatment with an acetone solution of sodium iodide deposits yellow crystals.

*Example III*

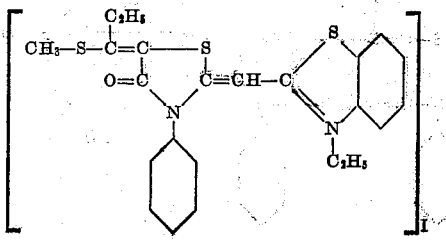

A mixture of 75 cc. of pyridine, 10 cc. of propionic anhydride, 10 cc. of triethylamine, and 13 grams of the thiazolone cyanine dye of the following structure:

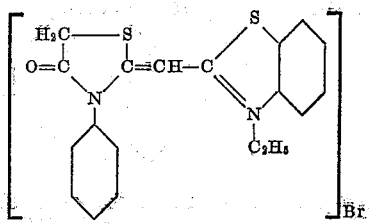

was heated with stirring at 120° C. for 20 minutes. During the course of 10 minutes, a total of 10 grams of phosphorus pentasulfide was added in portions at 120° C. After an additional 10 minutes of stirring at 120° C., the mixture was poured into cold water and stirred until the first formed oil solidified. The crude product was stirred with 300 cc. of a 10% aqueous solution of sodium hydroxide and purified by boiling out with isopropanol. There was obtained 10.2 grams of yellow powder which decomposes at about 200° C.

A mixture of 9.3 grams of the yellow powder and 10 grams of methyl p-toluenesulfonate was fused at 95° C. for 1 hour. After cooling, the product was washed with ether and dissolved in 10 cc. of warm acetone. The final product was precipitated as the iodide by adding 25 cc. of methanol containing 20% sodium iodide. The product was washed with water and purified by boiling out with isopropanol. A yield of 4.3 grams of a product melting at 225–228° C. was obtained.

*Example IV*

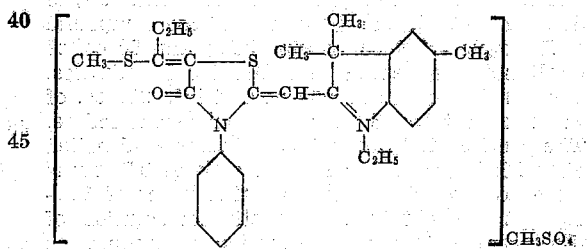

A mixture of 15 cc. of pyridine, 2 cc. of propionic anhydride, 2 cc. of triethylamine, and 2.0 grams of the thiazolone cyanine dye of the following structure:

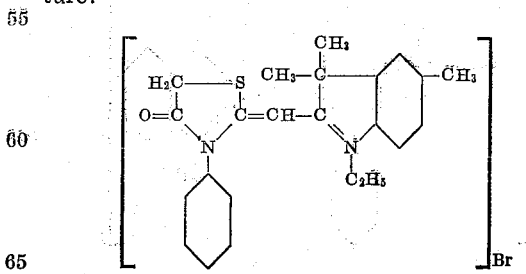

was heated at 120° C. for 3 minutes. There were then added 2 grams of phosphorus pentasulfide and the mixture heated at 115° C. for 15 minutes. A dark red oil was precipitated by the addition of 100 cc. of water and washed with water by decantation. The product was fused with 3 cc. of methyl sulfate at 95° C. for 10 minutes to yield 4.5 grams of a yellow-orange solution which may be employed in dye synthesis.

Example V

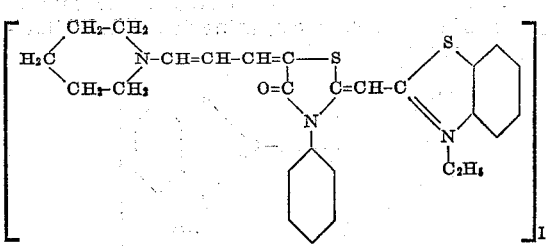

A mixture of 0.5 gram of the product of Example III, 0.3 gram of β-anilinoacrolein anil hydrochloride, 10 cc. of methanol, and 0.5 gram of piperidine was heated at reflux for 5 minutes. The reaction mixture was poured into 60 cc. of water containing 1 gram of potassium iodide. The crystals were separated and purified by boiling out with isopropyl alcohol. A yield of 0.4 gram of a product having a melting point of 270–271° C. was obtained. A methanol solution of the compound has an absorption maximum at 540 mµ.

Example VI

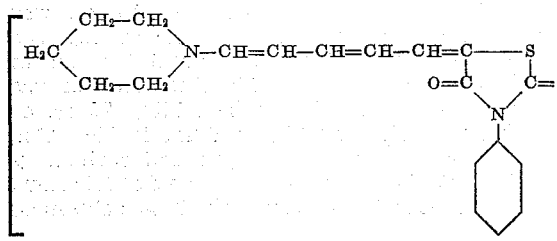

A mixture of 2.85 grams of glutaconaldehyde dianil hydrochloride, 4.3 grams of the compound of Example III, 1 cc. of piperidine and 50 cc. of methanol was heated at reflux for 30 minutes. The reaction mixture was poured into 300 cc. of water containing 5 grams of potassium iodide. The precipitated product was filtered and boiled out with isopropyl alcohol. A yield of 3.7 grams of a compound having a melting point of 195–198° C. was obtained. A methanol solution of the product has an absorption maximum at 624 mµ.

Example VII

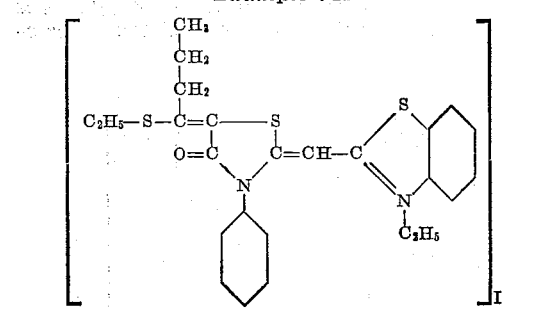

A mixture of 25 grams of the compound of Example I, 20 cc. of n-butyric anhydride, 100 cc. of pyridine and 20 cc. of triethylamine was heated and stirred at 120° C. for 20 minutes. There were then added 20 grams phosphorus pentasulfide and stirring at 120° C. continued for 20 minutes. The reaction mixture was poured into 700 cc. of cold water. The resulting brown precipitate was filtered off, washed with water, and boiled out with 100 cc. of isopropyl alcohol. A yield of 20.9 grams of the dried and purified product was obtained. The compound is presumed to be an inner salt characterized by the following formula:

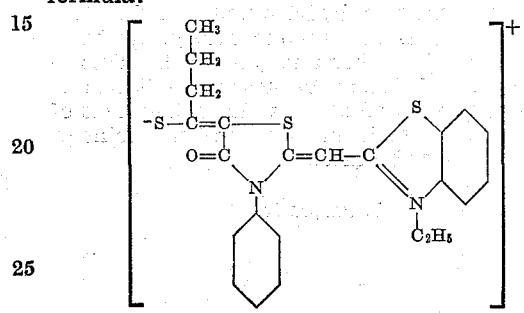

A mixture of 2 grams of the above material and 2 grams of ethyl p-toluenesulfonate was fused at 95° C. for 30 minutes. The reaction mixture was dissolved in 30 cc. of hot acetone, and 10 cc. of a 10% solution of sodium iodide in acetone was added. After cooling, the crystals were separated and purified by boiling out with isopropyl alcohol. A yield of 1 gram of a product melting between 210–213° C. was obtained.

The anions of the foregoing thiazolone cyanine dye salt intermediates may be replaced by other anions, such as iodide, thiocyanate, or perchlorate, by treating an alcohol solution of the dye salt with an aqueous or aqueous-alcohol solution containing a sodium or potassium salt of the desired anions.

The following examples describe in detail the method of preparing the symmetrical and unsymmetrical tetranuclear cyanine dyes from the foregoing thiazolone cyanine dye salts and dye salt intermediates, but it is to be understood that they are given merely for the purpose of illustration and are not to be construed as limitative.

Example VIII

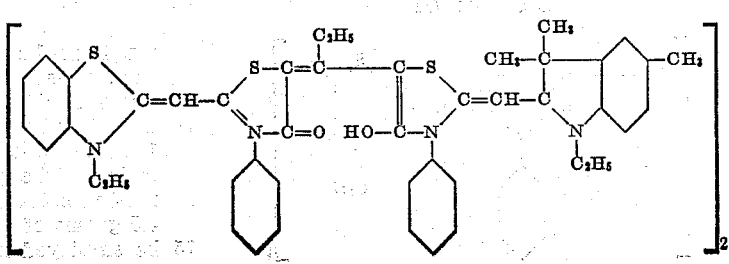

A mixture of 0.3 gram of p-toluenesulfonate salt of the product of Example III, 0.3 gram of the thiazolone cyanine dye utilized in Example IV, 15 cc. of methanol, and 0.5 cc. of triethylamine was heated at reflux for 15 minutes. 20 cc. of 20% sodium bromide in methanol was added and the dye separated on cooling and was purified by boiling out with isopropyl alcohol. A yield of 0.4 gram of a product melting at 226–227° C. was obtained. A methanol solution of this dye absorbs with a maximum at 660 mμ. When incorporated into a bromoiodo photographic emulsion, the optical sensitization ranges from 580 to 760 mμ with a maximum at 725 mμ.

were heated at reflux for 5 minutes. After cooling, the dye crystals were removed and purified by boiling out with isopropyl alcohol. A yield of 0.25 gram of a product melting at 237–239° C. was obtained. A methanol solution of the dye absorbs light with two maxima at 420 mμ. and 734 mμ. The sensitization of a photographic emulsion is extended to 800 mμ with a maximum at 760 mμ.

*Example XI*

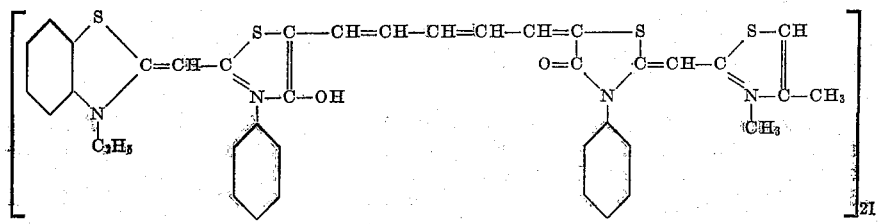

A mixture of 0.5 gram of the product of Example VI, 20 cc. of methanol, 0.5 cc. of tri-

*Example IX*

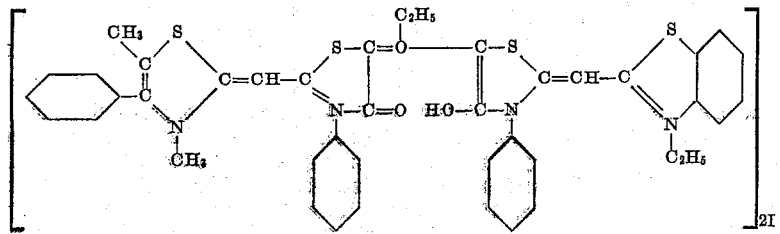

A mixture of 0.3 gram of the product of Example II, 0.3 gram of the thiazolone cyanine dye utilized in Example III, 20 cc. of isopropyl alcohol, and 1 cc. of triethylamine was heated at reflux for 10 minutes. Two cc. of 20% sodium iodide in methanol was added and the dye separated on cooling and was purified by boiling out with isopropyl alcohol. A yield of 0.5 gram of a product melting at 225–226° C. was obtained. In methanol solution this dye absorbs with a maximum at 627 mμ. The dye sensitizes a photographic emulsion with a maximum at 695 mμ.

ethylamine, and 0.4 gram of a thiazolone dye having the following formula:

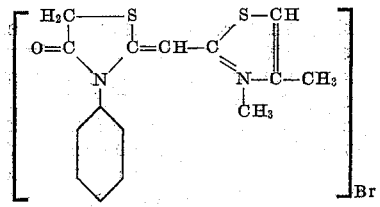

*Example X*

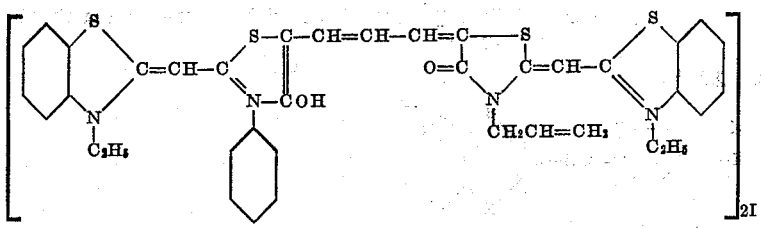

A mixture of 0.5 gram of the product of Example V, 20 cc. of methanol and 0.5 gram of triethylamine, 0.4 gram of a thiazolone cyanine dye of the following structure:

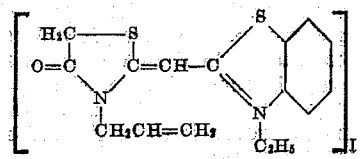

was heated at reflux for 5 minutes. After cooling, the reaction mixture was poured into an aqueous solution of potassium iodide, the dye was separated and purified by boiling out with isopropyl alcohol. A yield of 0.4 gram of a product melting at 214–218° C. was obtained. A methanol solution has absorption maxima at 447 and 811 mμ. When the dye is incorporated in a photographic emulsion the sensitization is extended to 900 mμ with a maximum at 850 mμ.

Example XII

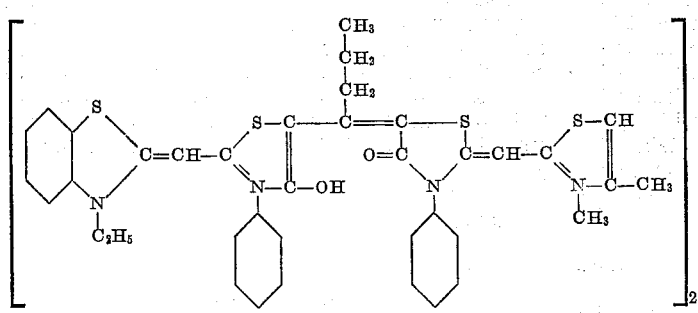
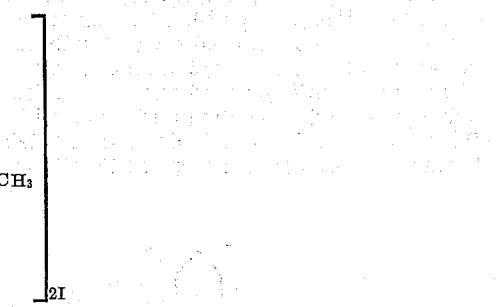

A mixture of 0.7 gram of the product of Example VII and 2 cc. of methyl sulfate was fused at 95° C. for 30 minutes. There were then added 25 cc. of isopropanol, 3 cc. of triethylamine, and 0.4 gram of a thiazolone cyanine dye having the following formula:

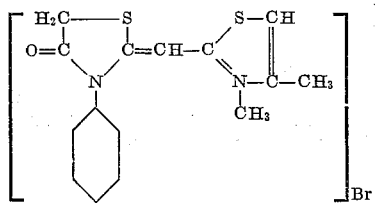

The resulting mixture was heated at reflux for 10 minutes. After cooling, the mixture was poured into an aqueous solution of sodium iodide, and the precipitated dye purified by boiling out with isopropanol. A yield of 0.3 gram of a dye melting at 244°–251° C. was obtained. A methanol solution of the dye had an absorption maximum at 623 m$\mu$. When added to a photographic silver-halide emulsion, the dye extends the range of sensitization to 735 m$\mu$ with a maximum at 700 m$\mu$.

Example XIII

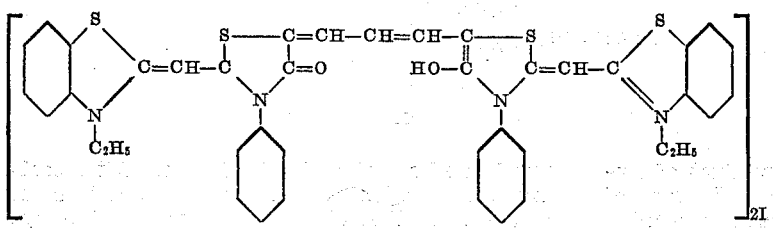

A mixture of 0.61 gram of the product of Example V, 0.43 gram of the thiazolone cyanine dye utilized in Example III, 30 cc. of methanol and 0.5 cc. of triethylamine was heated at reflux for 15 minutes. After cooling, the mixture was poured into an aqueous solution of sodium iodide and the precipitated dye purified by boiling out with methyl alcohol. A yield of 0.6 gram of a product melting at 279–280° C. was obtained. The absorption maxima of a methanol solution of the dye are at 418 and 437 m$\mu$.

Example XIV

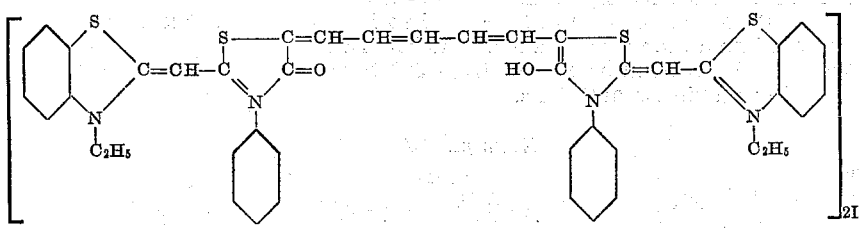

A mixture of 0.64 gram of the product of Example VI, 0.43 gram of the thiazolone cyanine dye utilized in Example III, 30 cc. of methanol and 0.5 cc. of triethylamine was heated at reflux for 15 minutes. The dye separated on pouring the reaction mixture into aqueous potassium iodide and purified by boiling out with methyl alcohol. A yield of 0.6 gram of a product melting at 215–216° C. was obtained. A methanol solution of the dye has one absorption maximum at 808 m$\mu$ and another of lesser intensity at 450 m$\mu$.

It is evident from the foregoing examples that the procedure employed in the preparation of tetranuclear cyanine dyes is simple and requires a shorter period of time. By merely choosing from a wide variety of thiazolone cyanine dye and dye intermediates, both symmetrical and unsymmetrical tetranuclear cyanine dyes are obtained in excellent yield and in readily purifiable form.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited solely by the appended claims.

I claim:
1. Unsymmetrical tetranuclear cyanine dyestuffs having the general formula:

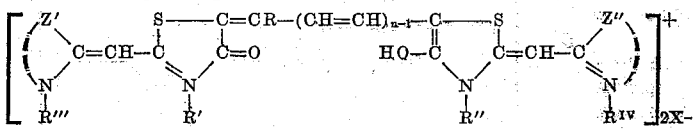

wherein n represents a positive integer of from 1 to 3, R is selected from the class consisting of hydrogen and alkyl, R being only alkyl when n represents 1, R' and R'' are selected from the class consisting of alkyl, allyl, aryl and aralkyl groups, R''' and R'^V are selected from the class consisting of lower alkyl, lower hydroxyalkyl, lower alkoxyalkyl, aryl of the benzene and naphthalene series, and aralkyl groups, X represents an acid radical, Z' and Z'' are the radicals of heterocyclic nuclei of the type used in cyanine dyes, and wherein at least one of the groups of radicals R'—R'' and Z'—Z'' are dissimilar.

2. An unsymmetrical tetranuclear cyanine dyestuff having the formula:

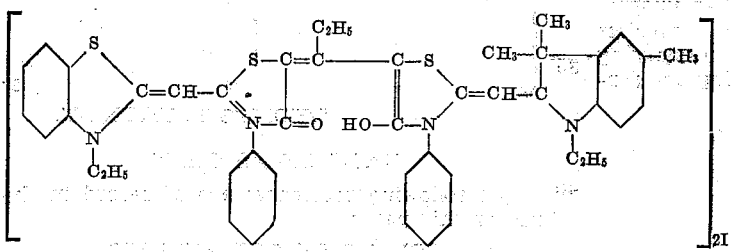

3. An unsymmetrical tetranuclear cyanine dyestuff having the formula:

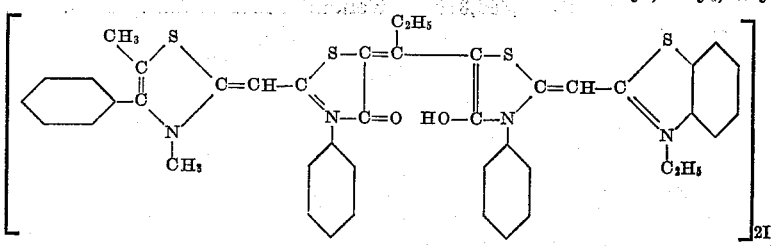

4. An unsymmetrical tetranuclear cyanine dyestuff having the formula:

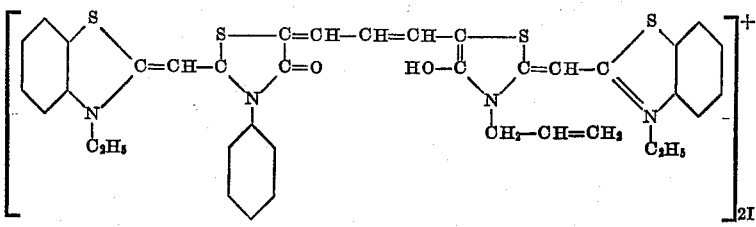

5. A process for the production of tetranuclear cyanine dyestuffs which comprises heating in the presence of a basic condensing agent a thiazolone cyanine dye of the general formula:

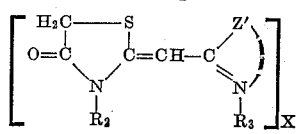

with a thiazolone cyanine dye intermediate characterized by a formula selected from the class consisting of the following formulae:

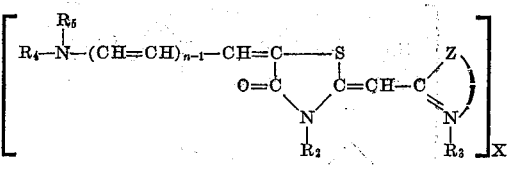

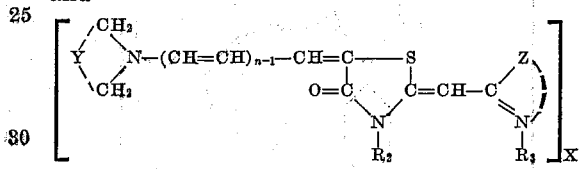

and

wherein n represents a positive integer of from 1 to 3, $R_2$ is selected from the class consisting of alkyl, allyl, aryl and aralkyl groups, $R_3$ represents a member selected from the class consisting of lower alkyl, lower hydroxyalkyl, lower alkoxyalkyl, aryl of the benzene and naphthalene series and aralkyl groups, $R_4$ represents an aryl group, $R_5$ represents a member selected from the class consisting of hydrogen and acetyl group, $R_6$ represents a member selected from the class consisting of alkyl and aralkyl groups, $R_7$ represents an alkyl group, X represents an acid radical, Y represents the atoms necessary to complete a saturated nitrogenous heterocyclic ring system selected from the class consisting of piperidine, β- and γ-pipecoline, pyrrolidine, morpholine, and tetrahydroquinoline, Z and Z' are residues of heterocyclic nuclei of the type used in cyanine dyes.

6. A process for the production of an unsymmetrical tetranuclear dyestuff which comprises heating in the presence of a basic condensing agent a thiazolone cyanine dye have the formula:

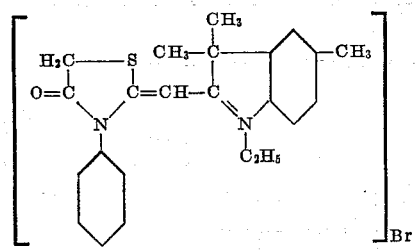

with a thiazolone cyanine dye intermediate having the formula:

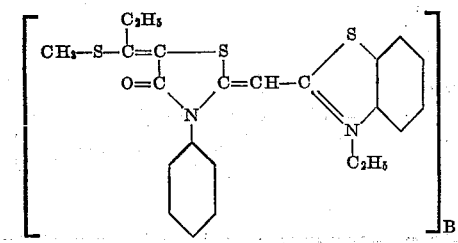

7. A process for the production of an unsymmetrical tetranuclear dyestuff which comprises heating in the presence of a basic condensing agent a thiazolone cyanine dye having the formula:

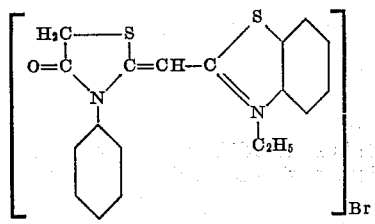

with a thiazolone cyanine dye intermediate having the formula:

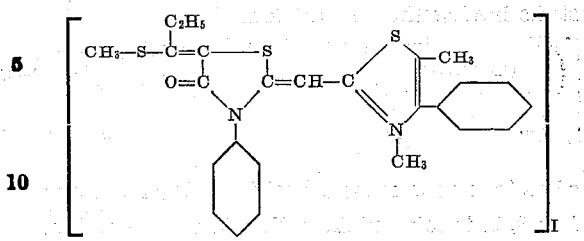

8. A process for the production of an unsymmetrical tetranuclear dyestuff which comprises heating in the presence of a basic condensing agent a thiazolone cyanine dye having the formula:

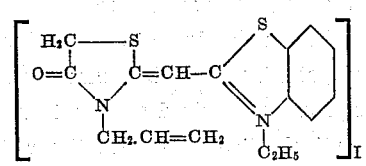

with a thiazolone cyanine dye intermediate having the formula:

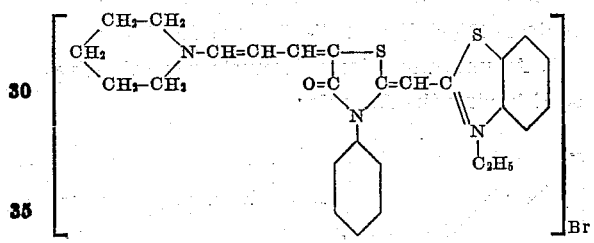

THOMAS R. THOMPSON.

REFERENCES CITED

The following references are of record in the file of this patent:

UNITED STATES PATENTS

| Number | Name | Date |
|---|---|---|
| 2,395,879 | Kendall | Mar. 5, 1946 |